United States Patent [19]

Saito

[11] Patent Number: 5,406,257

[45] Date of Patent: Apr. 11, 1995

[54] DELAYED ACTION ALARM DEVICE FOR LOCKS

[75] Inventor: Takao Saito, Nagoya, Japan

[73] Assignee: Kabushiki Kaisha Saikosha, Japan

[21] Appl. No.: 172,417

[22] Filed: Dec. 22, 1993

[30] Foreign Application Priority Data

Dec. 25, 1992 [JP] Japan .................................. 4-346621

[51] Int. Cl.$^6$ ...................... G08B 13/02; E05B 45/06; B62H 5/20
[52] U.S. Cl. .............................. 340/542; 70/DIG. 49; 340/427
[58] Field of Search ............................. 340/542, 427; 74/DIG. 49

[56] References Cited

U.S. PATENT DOCUMENTS 4,980,667 12/1990 Ames ................................... 340/427
5,194,845 3/1993 Sirmon et al. ....................... 340/542

Primary Examiner—Glen Swann
Attorney, Agent, or Firm—Davis, Bujold & Streck

[57] ABSTRACT

An alarm device for locks detects an attempt to break the lock as vibration and generates an alarm. The alarm device is provided with a first timer having a first predetermined time period and a second timer having a second predetermined time period. The first predetermined time period is provided for preventing the vibration caused during locking from triggering the alarm. The second predetermined time period is provided for preventing the vibration caused during unlocking from triggering the alarm. The alarm device has its alarm action delayed according to the first and the second predetermined time periods for preventing a false alarm.

16 Claims, 9 Drawing Sheets

DELAYED ACTION ALARM DEVICE FOR LOCKS

BACKGROUND OF THE INVENTION

This invention relates to an alarm device to be provided on locks for security purpose.

A variety of locks are known which are built sturdy enough to provide security against intended harm. Nevertheless, these sturdy locks are not totally resistible against violent attacks.

SUMMARY OF THE INVENTION

Wherefore, the object of the present invention is to provide an alarm device for locks which generates an alarm sound in response to an attack on the lock, thereby informing any surrounding people of the attack and scaring the attacker away.

Figure 7:
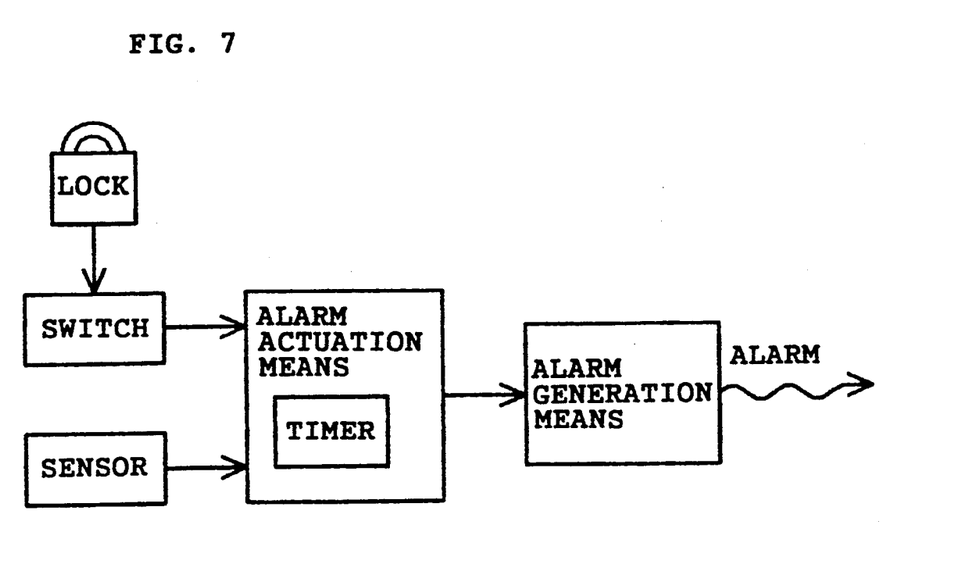
FIG. 7 is a block diagram schematically showing a lock provided with the present alarm device.

In order to attain the stated object, the alarm device according to the first aspect of the present invention is provided in the lock, and includes, as shown in FIG. 7,:
- a switch for turning power on or off according to whether the lock is locked or unlocked;
- a sensor for detecting vibration;
- alarm generation means for generating an alarm; and
- alarm actuation means for actuating the alarm generation means when the sensor detects any vibration caused after a first predetermined time period has elapsed after the power is turned on.

In operation, when a lock is locked with the alarm device mounted thereon, the switch turns the power on. After a first predetermined time period has elapsed after the power is turned on, any intended harm to the lock is detected as vibration by the sensor. Responsively, the alarm actuation means actuates the alarm generation means thereby causing an alarm. Any surrounding people are thus made alert to the attack on the lock, and the attacker can be scared away.

Since an alarm is not generated for any vibration caused before the first predetermined time period has elapsed, the vibration caused during locking does not trigger the alarm.

The second aspect of the invention proposes another alarm device for locks, which includes:
- a switch for turning power on or off according to whether the lock is locked or unlocked;
- a sensor for detecting vibration;
- alarm generation means for generating an alarm; and
- alarm actuation means for actuating, if the sensor detects any vibration caused after a first predetermined time period has elapsed after the power is turned on, the alarm generation means after elapse of a second predetermined time period after the vibration is detected by the sensor.

When a lock is locked with the alarm device according to the second aspect of the invention, and the power of the alarm device is turned on, any attack on the lock is detected as vibration by the sensor after a first predetermined time period has elapsed. A second predetermined time period is provided after the detection of vibration to prevent activation of the alarm generation means. When the second predetermined time period has expired, the alarm actuation means actuates the alarm generation means, thereby causing an alarm. The attack on the lock is reported aloud to the surrounding area, and the attacker can be scared away.

Thus, even if a vibration is detected by the sensor after the elapse of the first predetermined time period, the alarm device does not issue an alarm until the second predetermined time period has elapsed after the detection. Similar to the alarm device according to the first aspect of the invention, the vibration caused before elapse of the first predetermined time period does not trigger an alarm. Therefore, the vibration caused during locking does not result in generation of an alarm. Likewise, in the alarm device according to the second aspect of the invention, the vibration caused during unlocking does not trigger an alarm, as long as the unlocking is finished before the second predetermined time period has expired. Thus, a false alarm because of the vibration caused during locking or unlocking is prevented.

The third aspect of the invention further proposes a lock which is provided with any of the above two alarm devices integrally formed thereon.

The lock according to the third aspect of the invention, integrally provided with the alarm device of the first or the second aspect of the invention, attains the similar effect by similar operation to the above described alarm devices.

BRIEF DESCRIPTION OF THE DRAWINGS

An embodiment of the present alarm device is explained hereunder, by way of example, referring to the drawings, although it is understood that other embodiments are within the scope of the present invention, in which.

DETAILED DESCRIPTION OF THE PREFERRED EMBODIMENT

An embodiment of the present invention is explained hereunder with reference to the drawings.

Figure 1:
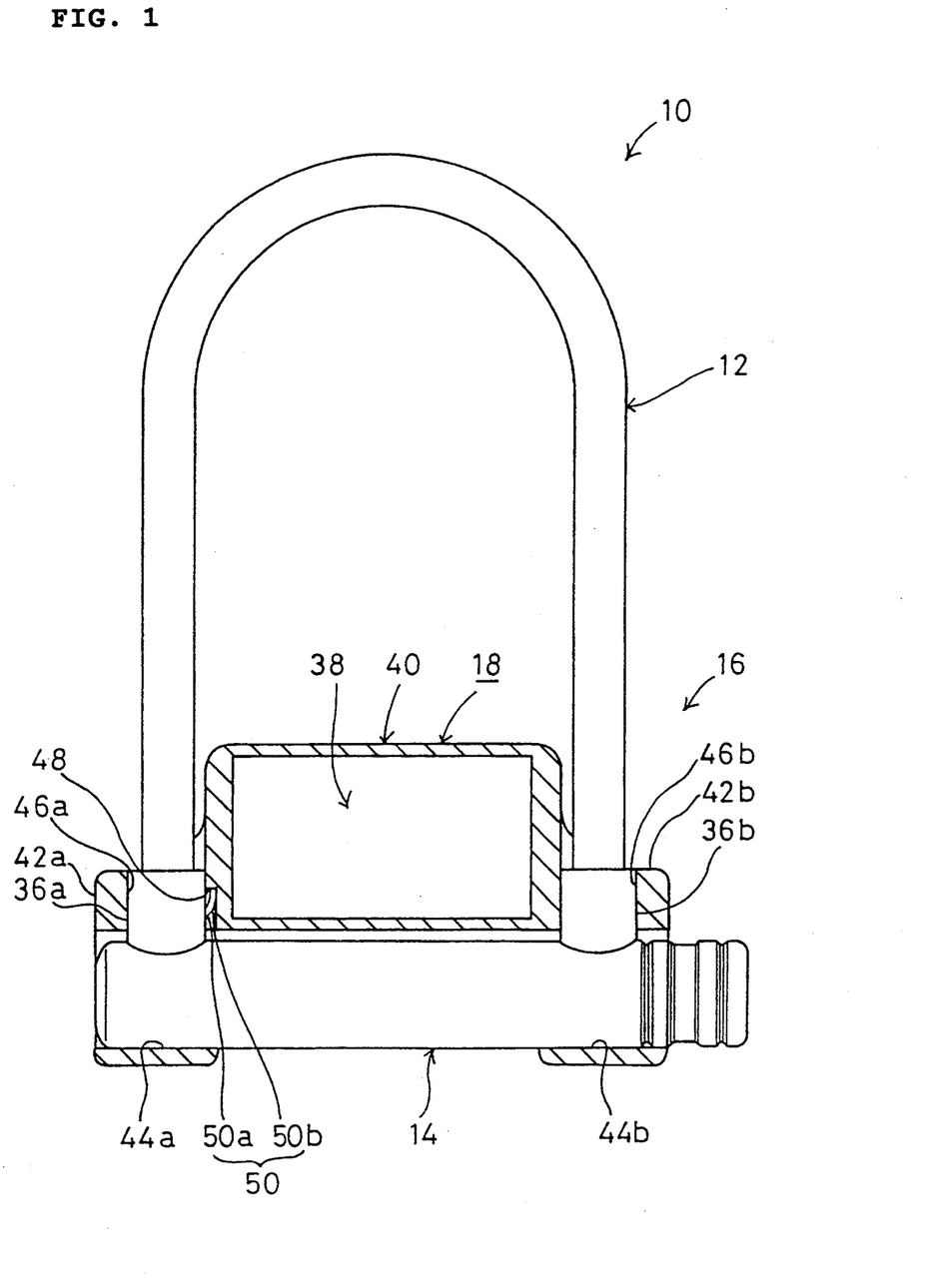
FIG. 1 is a partially cut away plan view of an alarm device of the embodiment which is provided on a padlock.
Figure 2:
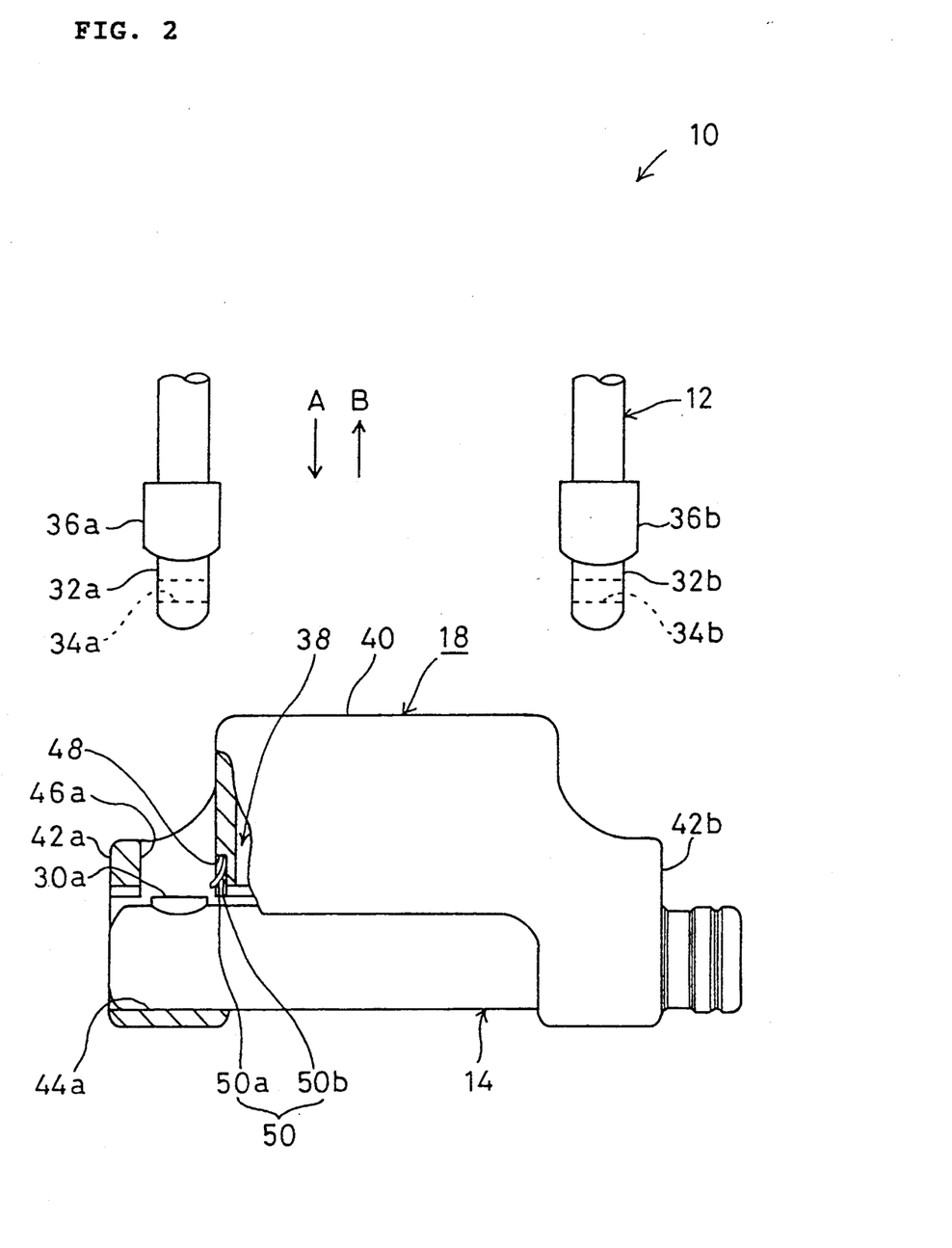
FIG. 2 is a partially cut away schematic view of the present alarm device shown in association with a portion of a lock.

As shown in FIGS. 1 and 2, a present padlock 10 is formed of a lock unit 16 having a U-shaped shackle 12 and a cylindrical body 14, and an alarm unit 18. The construction of the lock unit 16 is explained hereinafter in detail.

Figure 3:
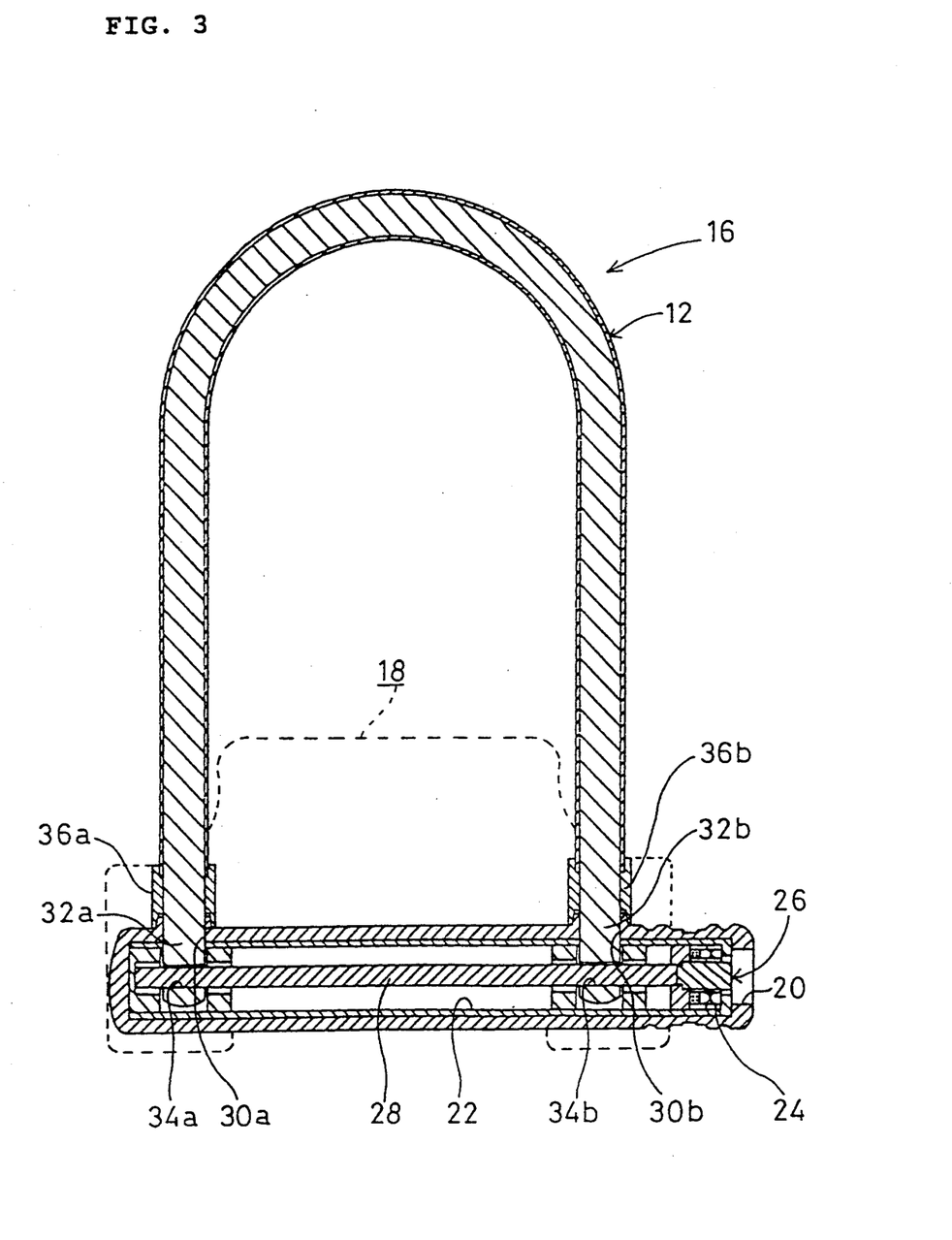
FIG. 3 is a sectional view of a padlock provided with the present alarm device shown by a phantom line.
Figure 4A:
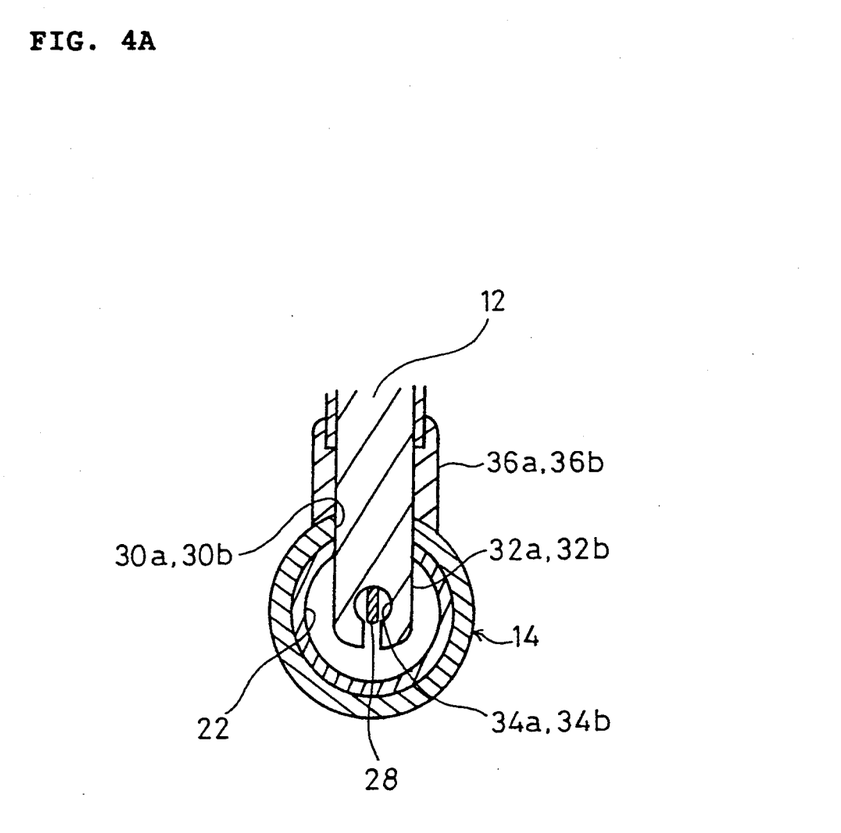
FIGS. 4A and 4B are side sectional views of the lock describing the state when locked or unlocked.
Figure 4B:
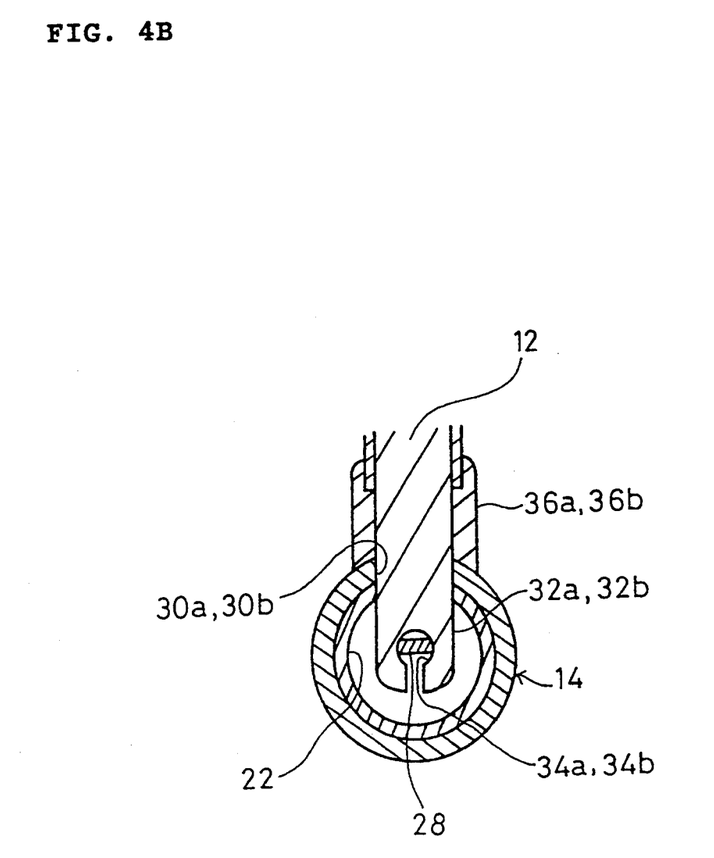

As shown in FIG. 3, the cylindrical body 14 of the lock unit 16 has a cylindrical inner cavity 22 having a key receiving aperture 20 at one end. A locking mechanism 26, having a plurality of pin tumblers 24, is provided within the inner cavity 22. When operated with a key which is not shown in the figure, the locking mechanism 26 is rotatably displaced in a peripheral direction of the inner cavity 22. The inner cavity 22 also contains a rotatable bolt 28 which extends in the axial direction of the inner cavity 22 with one end thereof connected to the locking mechanism 26. As shown in FIGS. 4A and 4B, the rotatable bolt 28 is a flat bar having rounded longitudinal end portions, and is rotatably displaced around its axis in accordance with the rotational displacement of the locking mechanism 26. The cylindrical body 14 is further provided with a pair of bores 30a, 30b which extend in the radial direction of the cylindrical body 14 and communicate with the inner cavity 22.

The shackle 12 has a pair of end portions 32a, 32b to be received by the bores 30a, 30b. The end portions 32a, 32b have a pair of engaging grooves 34a, 34b. FIG. 4A shows how each engaging groove 34a, 34b receives the rotatable bolt 28. A pair of tubular-shaped stoppers 36a, 36b are attached to end portions 32a, 32b. The stoppers 36a, 36b serve to keep the rotatable bolt 28 in the circular portion of the engaging grooves 34a, 34b when the end portions 32a, 32b of the shackle 12 are inserted to the bores 30a, 30b.

Thus, by having a key turn in the locking mechanism 26 with the end portions 32a, 32b of the shackle 12 received in the bores 30a, 30b, the rotatable bolt 28 is rotated thereby lockingly engages the engaging grooves 34a, 34b as shown in FIG. 4B, or thereby releasably disengages from the engaging grooves 34a, 34b as shown in FIG. 4A. Locking or unlocking of the lock unit 16 is thus performed.

The lock unit 16 is a known lock commonly used for bicycles, and further explanation of the structure is omitted for simplification.

Explained hereinafter is the structure of the alarm unit 18.

As shown in FIGS. 1 and 2, the alarm unit 18 is formed of a housing 40 and a pair of elongated portions 42a, 42b on either side of the housing 40. The housing 40 is provided with a containment area 38 therein which has a rectangular cross-section as seen in FIG. 1. Within the elongated portions 42a, 42b, there are provided cylindrical receiving bores 44a, 44b formed along the longitudinal direction of the containment area 38, and shackle receiving bores 46a, 46b contiguous with the cylindrical receiving bores 44a, 44b and formed along the lateral direction of the containment area 38.

The cylindrical receiving bores 44a, 44b have substantially the same axis and diameter and receive the cylindrical body 14 therein. The axes of the shackle receiving bores 46a, 46b are substantially parallel to each other. The diameter of the shackle receiving bores 46a, 46b are substantially the same and slightly greater in size than the outer diameter of the stoppers 36a, 36b of the shackle 12 such that the stoppers 36a, 36b of the shackle 12 can be inserted to the shackle receiving bores 46a, 46b.

By inserting the cylindrical body 14 into the cylindrical receiving bores 44a, 44b and inserting the shackle 12 into the shackle receiving bores 46a, 46b up to the stoppers 36a, 36b, the padlock 10 is completed. When the locking mechanism 26 is operated such that the engaging grooves 34a, 34b of the shackle 12 are engaged with the rotatable bolt 28 of the cylindrical body 14, the padlock 10 is locked. The padlock 10 can be unlocked by releasing the rotatable bolt 28 from the engaging grooves 34a, 34b.

Figure 5A:
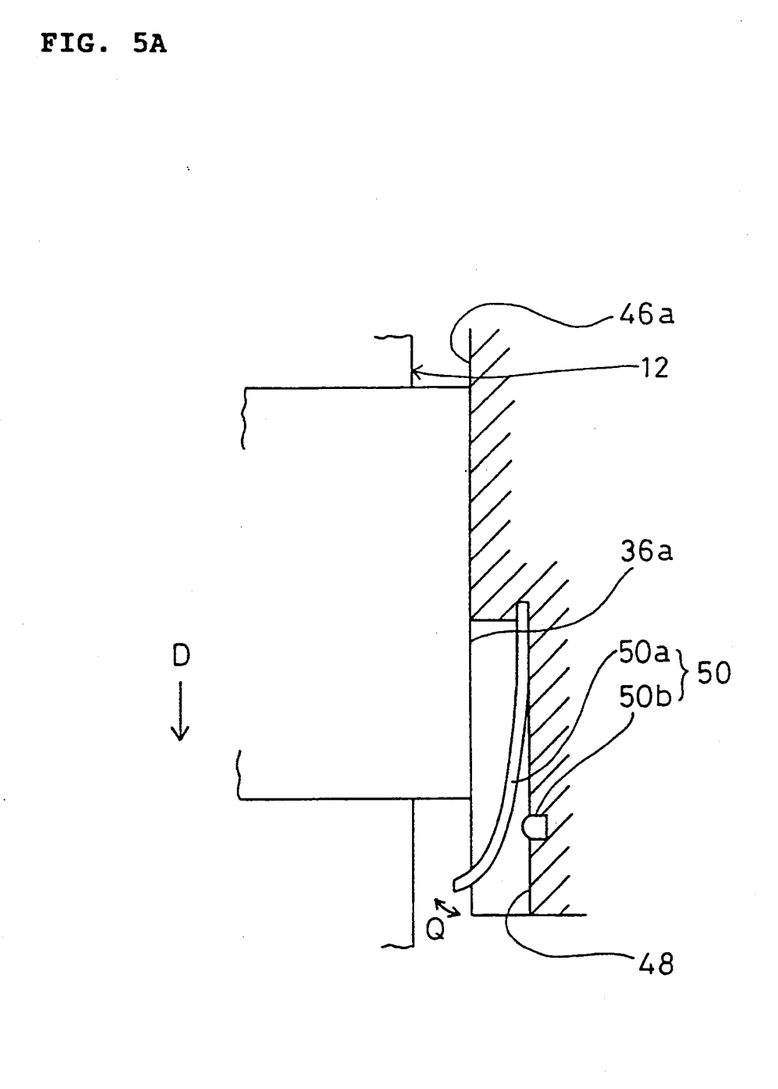
FIGS. 5A and 5B are enlarged views of and around the switch before and after the lock is locked.

As shown in FIGS. 1, 2, 5A and 5B, a recess 48 is provided in the shackle receiving bore 46a, and has a switch 50 having a plate member 50a and a pin member 50b. The plate member 50a, as shown in FIG. 5A, is resiliently deformable in the direction of an arrow Q in that figure. When a force is applied on the plate member 50a toward the pin member 50b by the shackle 12 being locked, the plate member 50a deforms and contacts with the pin member 50b. Once relieved of the force, the plate member 50a returns to its original position away from the pin member 50b.

Figure 6:
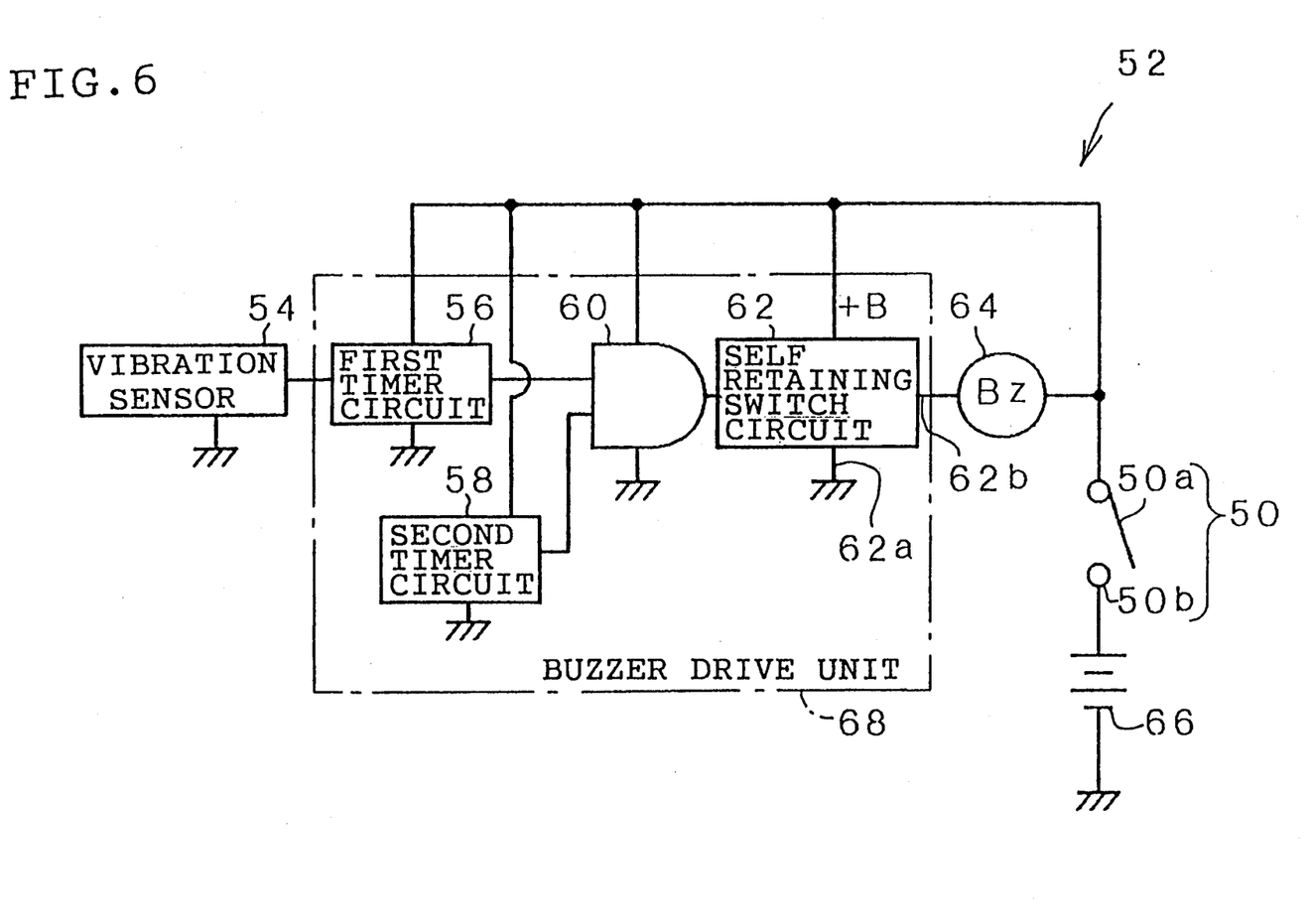
FIG. 6 is a schematic diagram showing an electrical construction of the alarm device.

As shown in FIG. 6, the switch 50 is part of the alarm generation mechanism 52. In addition to the switch 50, the alarm generation mechanism 52 includes a vibration sensor 54, a first timer circuit 56, a second timer circuit 58, an AND circuit 60, a self retaining switch circuit 62, an electronic buzzer 64 and a battery 66. The first timer circuit 56, the second timer circuit 58, the AND circuit 60 and the self retaining switch circuit 62 make up a buzzer drive unit 68.

The vibration sensor 54 may include a piezoelectric element and generates a signal in response to any vibration received by the vibration sensor 54. The output from the vibration sensor 54 is fed to the first timer circuit 56. The first timer circuit 56 receives the signal from the vibration sensor 54 and, after ten seconds, outputs a pulse signal having a high level. The output terminal of the first timer circuit 56 is connected with the one of the input terminals of the AND circuit 60, and the output terminal of the second timer circuit 58 is connected with the other of the input terminals of the AND circuit 60. The second timer circuit 58 outputs a high level signal twenty seconds after it is supplied with power, and continues to output the high level signal until the power is cut off.

The AND circuit 60 outputs a high level signal when both the outputs from the first timer circuit 56 and second timer circuit 58 are high level signals. The output terminal of the AND circuit 60 is connected to the input terminal of the self retaining switch circuit 62. The self retaining switch circuit 62 connects its grounded end 62a to its output end 62b when a high level signal is input from the AND circuit 60. The output end 62b of the self retaining switch circuit 62 is connected to a known electronic buzzer 64. These components make up the alarm generation mechanism 52 and, except for the switch 50, are housed in the containment area 38.

Figure 5B:
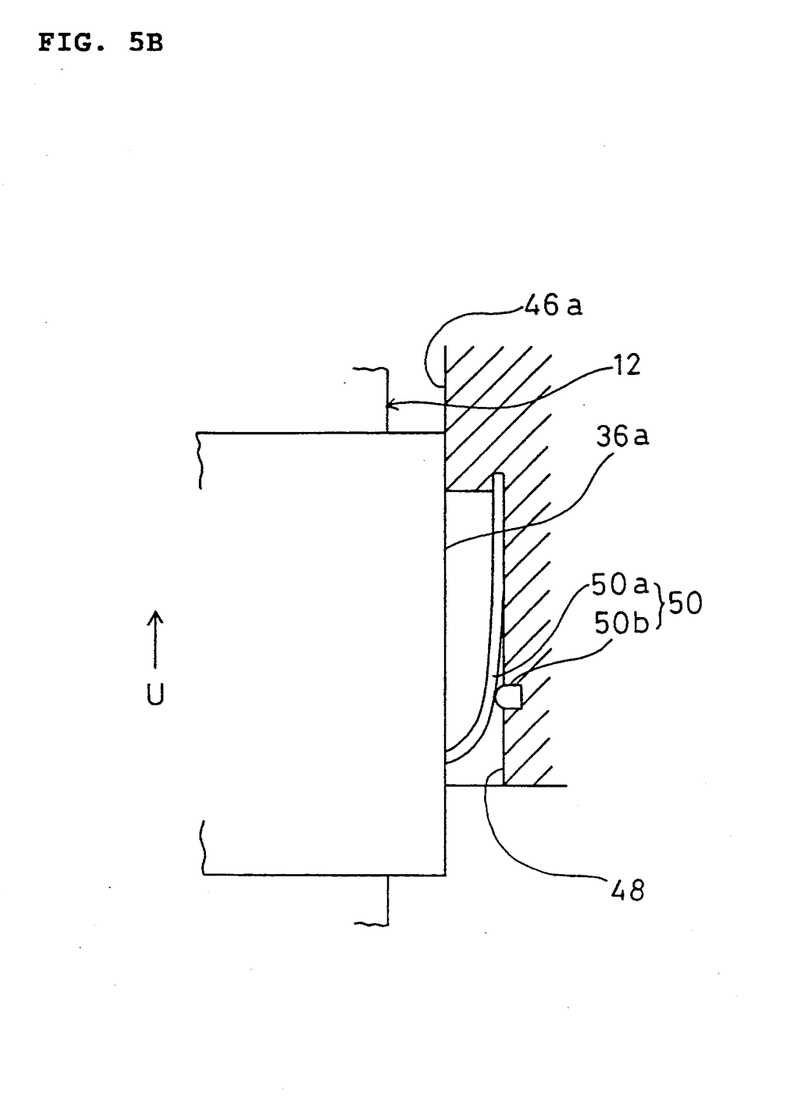

The switch 50, as mentioned above, is provided on the recess 48 in the shackle receiving bore 46a. As shown in FIGS. 5A and 5B, when the shackle 12 is inserted to the shackle receiving bore 46a in the direction indicated by an arrow D of FIG. 5A, the stopper 36a of the shackle 12 presses and resiliently deforms the plate member 50a, thereby contacting the plate member 50a with the pin member 50b. The switch 50 is closed and connects the battery 66 to the alarm generation mechanism 52. When the shackle 12 is removed in the direction indicated by an arrow U of FIG. 5B, the plate member 50a is released and the switch 50 turns the power off.

Hereinafter, the operation of the padlock 10 will be described.

First, the shackle 12 is inserted in the direction indicated by the arrow A of FIG. 2 toward the alarm unit 18 until the end portions 32a, 32b travel through the shackle receiving bores 46a, 46b and are received in the bores 30a, 30b of the cylindrical body 14. Accordingly, the stoppers 36a, 36b of the shackle 12 are inserted to the cylindrical receiving bores 44a, 44b, causing the switch 50 to connect power to the alarm generation mechanism 52. The locking mechanism 26 is rotated by a key, thereby engaging the rotatable bolt 28 within the cylindrical body 14 with the engaging grooves 34a, 34b of the shackle 12. The padlock 10 is thus locked.

Referring now to FIG. 6, since a vibration is caused by the locking procedure, the vibration sensor 54 generates a signal. In response, the first timer circuit 56 outputs a pulse signal to the AND circuit 60 after ten seconds. However, the output from the AND circuit 60 is not a high level signal since the second timer circuit 58 does not output a high level signal until twenty seconds has elapsed after the power is turned. Therefore, the self retaining switch circuit 62 is not activated, neither is the electronic buzzer 64. Inadvertent activation of the alarm unit 18 due to the vibration caused by the locking operation is thus prevented.

When the locking operation is completed, the padlock 10 is left still. The vibration sensor 54 therefore terminates its generation of signal.

If one attempts to break the padlock 10 and moves the padlock 10, the vibration sensor 54 detects the vibration and generates a signal. Ten seconds after receipt of the signal, the first timer circuit 56 generates a high level pulse signal. Thus, since both the input from the first timer circuit 56 and from the second timer circuit 58 become high level signal, the output from the AND circuit 60 becomes a high level signal. As a result, the self retaining switch circuit 62 is activated, and the grounded end 62a and output end 62b are connected. Consequently, the electronic buzzer 64 is supplied with power and generates an alarm.

Thus, in response to an attempt to break the padlock 10, the padlock 10 generates an alarm. The attack is reported aloud to anyone nearby and the attacker can be scared away.

Likewise, when the padlock 10 is moved during unlocking, generation of an alarm is delayed for ten seconds since the first timer circuit 56 does not generate a pulse signal until after ten seconds have elapsed since receipt of the signal from the vibration sensor 54. In the meantime, by unlocking the padlock 10 and disassembling the shackle 12 from the cylindrical body 14, the power to the alarm generation mechanism 52 is turned off and the alarm unit 18 will not be activated.

This invention has been described above with reference to a preferred embodiment as shown in the drawings. Modifications and alterations may become apparent to one skilled in the art upon reading and understanding the specification. Despite the use of the embodiment for illustration purposes, it is intended to include all such modifications and alterations within the scope and spirit of the appended claims.

For instance, the buzzer drive unit 68 may be a known microcomputer, and the alarm is not limited to an audible one, but may be a light, or both of them.

In the preferred embodiment, the delay of the first timer circuit 56 and the second timer circuit 58 are ten seconds and twenty seconds, respectively. However, these time periods may be arbitrarily determined according to the preference of the user and the circumstances. For instance, the delay of the first timer circuit 56 may be zero, or the first timer circuit 56 itself may be omitted.

Wherefore, having described the present invention, what is claimed is:

1. An alarm device, for a lock, comprising:
   an alarm;
   a power source;
   an alarm actuation mechanism electrically connected with said power source for actuating said alarm, said alarm actuation mechanism generating, when powered by said power source and in response to vibration of said alarm device detected after elapse of a first period of time, a signal for actuating said alarm, and first time delay means for delaying actuation of said alarm for said first period of time after power is supplied to said alarm actuation mechanism;
   a switch being electrically connected between said power source and said alarm actuation mechanism for selectively supplying and disconnecting power from said power source to said alarm actuation mechanism; and
   a sensor electrically connected to said alarm actuation mechanism for detecting vibration of said alarm device and supplying a signal to said alarm actuation mechanism;
   wherein said alarm actuation mechanism further comprises a second time delay means for delaying actuation of said alarm in response to vibration for a second period of time after vibration is sensed by said sensor.

2. The alarm device according to claim 1, wherein said first time delay means generates a high level signal after elapse of said first period of time.

3. The alarm device according to claim 2, wherein said second time delay means generates a high level signal after said second predetermined period.

4. The alarm device according to claim 3, wherein said alarm is activated only when both of said first and second time delay means generate high level signals.

5. The alarm device according to claim 4, wherein said alarm actuation mechanism further comprises an AND gate for receiving signals from both said first and second time delay means, and said AND gate generates a high level signal which activates said alarm only when said AND gate receives high level signals from both said first and second time delay means.

6. The alarm device according to claim 5, wherein said first period of time is twenty seconds and said second period of time is ten seconds.

7. The alarm device according to claim 6, wherein said alarm is an electronic buzzer and said AND gate is electrically connected with said electronic buzzer via a self-retaining switch circuit.

8. The alarm device according to claim 7, wherein said alarm device is incorporated in a lock.

9. A lock comprising:
   a shackle having two ends;
   a body for receiving each end of said shackle;
   a locking mechanism located inside said body;
   an alarm device comprising:
   an alarm;
   a power source;
   an alarm actuation mechanism electrically connected with said power source for actuating said alarm, said alarm actuation mechanism generating, when powered by said power source and in response to vibration of said alarm device detected after elapse of a first period of time, a signal for actuating said alarm, and first time delay means for delaying actuation of said alarm for said first period of time after said power is supplied to said alarm actuation mechanism;
   a switch being electrically connected between said power source and said alarm actuation mechanism for selectively supplying and disconnecting power from said power source to said alarm actuation mechanism; and
   a sensor electrically connected to said alarm actuation mechanism for detecting vibration of said alarm device and supplying a signal to said alarm actuation mechanism;

wherein said alarm actuation mechanism further comprises second time delay means for delaying actuation of said alarm in response to vibration for a second period of time after vibration is sensed by said sensor.

10. The lock according to claim 9, wherein said switch is located adjacent a shackle opening of said body and said switch is closed when one end of said shackle engages said shackle opening of said body.

11. The lock according to claim 10, wherein said first time delay means generates a high level signal after said first period of time.

12. The lock according to claim 11, wherein said second time delay means generates a high level signal after said second period of time.

13. The lock according to claim 12, wherein said alarm is activated only when both of said first and second time delay means generate high level signals.

14. The lock according to claim 13, wherein said alarm actuation mechanism further comprises an AND gate for receiving signals from both said first and second time delay means, and said AND gate generates a high level signal which activates said alarm only when said AND gate receives high level signals from both said first and second time delay means.

15. The lock according to claim 14, wherein said first period of time is twenty seconds and said second period of time is ten seconds.

16. The lock according to claim 15, wherein said alarm is an electronic buzzer and said AND gate is electrically connected with said electronic buzzer via a self-retaining switch circuit.

* * * * *